Patented Oct. 13, 1953

2,655,493

UNITED STATES PATENT OFFICE 2,655,493

POLYMERIZABLE AND POLYMERIZED COMPOSITIONS COMPRISING AN O-ALLYLISOUREA

John A. Price, Stamford, Conn., assignor to American Cyanamid Company, New York, N. Y., a corporation of Maine No Drawing. Application October 24, 1951, Serial No. 253,005

16 Claims. (Cl. 260—77.5)

This invention relates to the production of new materials having valuable and characteristic properties that make them especially suitable for use in industry, for example in molding, casting, coating, electrically insulating and adhesive applications, and for other purposes. More particularly the invention is concerned with polymerizable compositions comprising, by weight (1) from about 1% to about 75% of an O-allylisourea, e. g., O-allylisourea itself, the formula for which is:

I
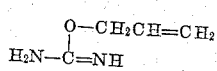

an N-monolkyl-O-allylisourea, an N,N-dialkyl-O-allylisourea, an N-monoaryl-O-allylisourea, an N,N-diaryl-O-allylisourea, etc., and (2) from about 25% to about 99% of a compound which is different from the compound of (1), is copolymerizable therewith and which contains a $CH_2=C<$ grouping or a plurality of $CH_2=C<$ groupings, e. g., styrene, acrylonitrile, ethyl acrylate, vinyl acetate, etc., or a plurality of such compounds. The scope of the invention also includes products comprising the polymerized composition obtained by polymerization of the aforementioned polymerizable composition, as well as method features whereby new and useful synthetic compositions are produced.

The O-allylisoureas are more fully described and claimed as such in the copending application of Ingenuin Hechenbleikner and Donald W. Kaiser, Serial No. 253,002, filed concurrently herewith, and now abandoned. The O-allylisoureas used in practicing the present invention are preferably those embraced by the general formula II
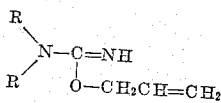

in which R is a member of the group consisting of hydrogen, alkyl and aryl, the R's being the same or different. Illustrative examples of alkyl and aryl radicals that are represented by R in Formula II are: methyl to octadecyl, inclusive, and the various isomeric forms thereof, cyclopentyl, cyclohexyl, cycloheptyl, benzyl, phenylethyl, phenylpropyl, phenyl, diphenyl, biphenylyl or xenyl, tolyl, xylyl, ethylphenyl, etc.

It is one of the primary objects of the present invention to prepare a new class of copolymers or interpolymers for use in industry.

Still another and important object of the invention is the production of copolymers or interpolymers of a basic monomer, more particularly an O-allylisourea, and one or more non-basic monomers, e. g., acrylonitrile, which polymerization products are more readily dyed, especially with acid dyes, than polymers of acrylonitrile or other non-basic monomer alone, or than many of the previously known or suggested copolymers of (1) acrylonitrile (or other non-basic monomer) and (2) another different monomer or monomers.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

The foregoing objects are attained by copolymerization of an O-allylisourea with one or more other comonomers which are copolymerizable therewith, more particularly such comonomers which contain either a single or a plurality of $CH_2=C<$ groupings, using, by weight, from about 1% to about 75%, preferably (for the usual applications) from about 1 or 2% to about 15 or 20%, of an O-allylisourea, e. g., N,N-dimethyl-O-allylisourea, N,N-diethyl-O-allylisourea, etc., and from about 25% to about 99%, preferably (for the usual applications) from about 98 or 99% to about 80 or 85% of a comonomer (or comonomers) containing one or more $CH_2=C<$ groupings. Heat, light or heat and light can be used to effect or to accelerate polymerization of the mixture of comonomers, although under such conditions the rate of polymerization in some cases may be relatively slow, as for instance when the O-allylisourea constitutes only a small amount (e. g., 1 to 5%) of the mixture of comonomers and the other comonomer normally has a slow polymerization rate. Hence, it is usually preferred to accelerate the polymerization by employing a polymerization catalyst accompanied by heat, light or heat and light. Further details of polymerization conditions are given hereinafter.

Examples of monomers (comonomers) containing a $CH_2=C<$ grouping that can be copolymerized with an O-allylisourea, e. g., N-mono-n-propyl-O-allylisourea, N-monophenyl-O-allylisourea, N,N - dixylyl - O - allylisourea, N,N-di(phenylethyl) - O - allylisourea, N - monocyclohexyl-O-allylisourea, N - monobenzyl-O-allylisourea, N-monotolyl-O-allylisourea, in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1 - chloroallyl, 2 - chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc.), and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p- chlorostyrenes, -bromostyrenes, -fluorostyrenes, -methylstyrenes, -ethylstyrenes, -cyanostyrenes, the various polysubstituted styrenes such, for example, as the various di-, tri- and tetra- chlorostyrenes, -bromostyrenes, -fluorostyrenes, -methylstyrenes, ethylstyrenes, cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole and the various allyl cyanostyrenes; the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with an O-allylisourea, e. g., N-methyl-O-allylisourea, to produce my new copolymer compositions are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatability and copolymerization characteristics of the mixed monomers.

Other and more specific examples of monomeric materials which can be mixed or blended with an O-allylisourea, e. g., N-ethyl-O-allylisourea, in the aforementioned proportions, and the resulting homogeneous or substantially homogeneous, polymerizable composition then polymerized, as hereinafter more fully described, to yield new and valuable copolymer compositions are the allyl compounds which are different from the basic monomer used in practicing the present invention and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

Additional examples of allyl compounds, and of other compounds containing one or more $CH_2=C<$ groupings that can be used in producing the new and useful copolymers or interpolymers of the present invention, are given in, for example, Drechsel and Padbury Patent No. 2,550,652 dated April 24, 1951, and especially in that portion thereof with particular reference to monomers used in forming copolymers with diallyl cyanamide.

Among the comonomers which are preferred for use in carrying my invention into effect are the vinyl compounds which are different from the primary basic monomer employed, including the vinyl aromatic compounds, more particularly the vinyl aromatic hydrocarbons (e. g., styrene, the various dialkyl styrenes, etc.), and the vinyl aliphatic compounds, e. g., acrylonitrile, acrylamide, etc., and other and different compounds containing a $CH_2=C<$ grouping, e. g., isopropenyl toluene, the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of the O-allylisourea, e. g., N-butyl-O-allylisourea, and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauryl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxides and of other catalysts that can be employed are given in the aforementioned Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between —80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is, the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization of the individual monomers present in the composition. When it is desired to use the inhibitor-modified composition, a catalyst is added in an amount sufficient to promote the polymerization reaction and to yield a copolymer. Any suitable inhibitor can be used, e. g., tannin, phenol, resorcinol, hydroquinone, ascorbic acid, isoascorbic acid, phenyl-α-naphthylamine, N,N'-di-2-naphthyl-p-phenylenediamine, certain cupric salts, e. g., cupric acetate, etc. The amount of the polymerization inhibitor may be considerably varied, but ordinarily it is employed in an amount not exceeding 3%, generally less than 1%, by weight of the monomer or mixture of comonomers, e. g., from 0.01% to 0.5% or 0.6% by weight thereof.

In order that those skilled in the art may better understand how the present invention can be carried into effect, the following examples are given by way of illustration and not by way of limitation. All parts and percentages are by weight.

*Example 1*

This example illustrates the preparation of homopolymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of prepurified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium metabisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

*Example 2*

A reaction vessel, equipped with a stirrer, reflux condenser, thermometer and gas-inlet tube is placed in a constant-temperature bath which is maintained at 35° C. To the vessel is added a solution of 50.35 parts of acrylonitrile, 2.65 parts of N,N-dimethyl-O-allylisourea, 900 parts of distilled water and 1.0 part of sulfuric acid. The pH of this solution is 3.3. A rapid stream of prepurified nitrogen is passed over the surface of the solution for 30 minutes. The nitrogen flow is then decreased to about one bubble per second. To the vessel is now added 1.71 parts of ammonium persulfate and 0.71 part of sodium bisulfite (meta), each dissolved in 50 parts of water. The polymerization is carried out for 5 hours at 35° C. The copolymer is collected on a Büchner funnel, washed with 1,000 parts of deionized water and dried in an oven at 70° C. for about 16 hours. The yield of dry, white copolymer of acrylonitrile and N,N-dimethyl-O-allylisourea amounts to 48.5 parts, a portion of which is used in the dye tests described in a later example.

*Example 3*

Exactly the same procedure is followed as described under Example 2 with the exception that instead of 2.65 parts of N,N-dimethyl-O-allylisourea there is used 2.65 parts of N,N-dicyclohexyl-O-allylisourea and 0.48 part of sulfuric acid instead of 1.0 part. A good yield of a solid copolymer of acrylonitrile and N,N-dicyclohexyl-O-allylisourea is obtained. A portion of the dry copolymer is used in the dye tests described in a later example.

*Example 4*

Same as in Example 2 with the exception that there are used 47.7 parts instead of 50.35 parts of acrylonitrile, 5.3 parts of N,N-dibenzyl-O-allylisourea instead of 2.65 parts of N,N-dimethyl-O-allylisourea and 0.91 part instead of 1.0 part of sulfuric acid; also, the time of polymerization is 8 hours instead of 5 hours at 35° C. A portion of the resulting solid copolymer of acrylonitrile and N,N-dibenzyl-O-allylisourea is employed in the dye tests described in a later example.

*Example 5*

In this example, too, exactly the same procedure is followed as described under Example 2 with the exception that the N,N-dimethyl-O-allylisourea is replaced with an equal weight of N,N-diethyl-O-allylisourea, 0.88 part of sulfuric acid is used instead of 1.0 part and the polymerization time at 35° C. is 6 hours. The yield of dry copolymer of acrylonitrile and N,N-diethyl-O-allylisourea amounts to 43.5 parts. A portion of the dry copolymer, which is cream-colored, is employed in the dye tests described in a later example.

*Example 6*

Same as in Example 2 with the exception that there are used 51.94 parts instead of 50.35 parts of acrylonitrile, 1.06 parts instead of 2.65 parts of N,N-dimethyl-O-allylisourea, and 0.4 part instead of 1.0 part of sulfuric acid. A portion of the resulting solid copolymer of acrylonitrile and N,N-dimethyl-O-allylisourea is employed in the dye tests described in a later example.

*Example 7*

Exactly the same procedure is followed as described under Example 2 with the exception that instead of 2.65 parts of N,N-dimethyl-O-allylisourea there is used 2.65 parts of O-allylisourea (Formula I), and 1.3 parts instead of 1.0 part of sulfuric acid. A good yield of a solid copolymer of acrylonitrile and O-allylisourea is obtained.

*Example 8*

Same as in Example 2 with the exception that there are used 45.05 parts instead of 50.35 parts of acrylonitrile; 7.95 parts of N,N-diphenyl-O-allylisourea instead of 2.65 parts of N,N-dimethyl-O-allylisourea; 2.53 parts of sulfuric acid instead of 1.0 part; and the polymerization time is 10 hours at 60° C. A portion of the resulting solid copolymer of acrylonitrile and N,N-diphenyl-O-allylisourea is employed in the dye tests described in a later example.

*Example 9*

Same as in Example 2 with the exception that there are used 42.4 parts instead of 50.35 parts of acrylonitrile; 10.6 parts of N,N-ditolyl-O-allylisourea instead of 2.65 parts of N,N-dimethyl-O-allylisourea; 1.83 parts of sulfuric acid instead of 1.0 part; and the polymerization time is 12 hours at 65° C. A portion of the resulting solid copolymer of acrylonitrile and N,N-ditolyl-O-allylisourea is employed in the dye tests described in a later example.

In the same manner described under Examples 2 to 9, inclusive, compositions comprising other copolymers of copolymerizable ingredients including, by weight, (1) from 1% to 20% of an O-allylisourea, more particularly an N,N-dialkyl-O-allylisourea (e. g., N,N-dimethyl-O-allylisourea, N,N-diethyl-O-allylisourea, etc.), an N,N-diaryl-O-allylisourea (e. g., N,N-diphenyl-O-allylisourea, etc.), and other N,N-substituted-O-allylisourea, etc.), and other N,N-substituted- or N,N-unsubstituted-O-allylisoureas, and (2) from 80% to 99% of a vinyl compound, numerous examples of which have been given in the specification prior to the examples, can be produced. A more specific example of a class of copolymers within the aforementioned broad class are copolymers of mixed monomers consisting of from about 2% to about 15% by weight of an N,N-dialkyl-O-allylisourea and the remainder acrylonitrile.

*Example 10*

A tripolymer of (1) a vinyl aliphatic compound, specifically acrylonitrile, (2) an alkyl ester of an acrylic acid, more particularly such an ester containing not more than 4 carbon atoms in the alkyl grouping, and specifically methyl acrylate, and (3) an N,N-dialkyl-O-allylisourea, specifically N,N-dimethyl-O-allylisourea, is produced by following exactly the same procedure given under Example 2 with the exception that there are used 47.7 parts instead of 50.35 parts of acrylonitrile and 2.65 parts of methyl acrylate in addition to 2.65 parts of N,N-dimethyl-O-allylisourea; also, the polymerization time at 35° C. is 6 hours instead of 5 hours. A portion of the resulting solid tripolymer of acrylonitrile, methyl acrylate and N,N-dimethyl-O-allylisourea is employed in the dye tests described in the following example.

*Example 11*

Samples of the homopolymeric acrylonitrile of Example 1 and of the copolymers of Examples 2 to 10, inclusive, are subjected to the following dye test:

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 2 to 10, inclusive, are dyed blue, the intensity being, in general, directly proportional to the percentage of the O-allylisourea used in forming the copolymer; that is, copolymers containing the higher content of the O-allylisourea yield, in general, the deeper dyeings. In marked contrast, the homopolymeric acrylonitrile of Example 1 fails to absorb any dye. The advantage of modifying an acrylonitrile polymerization product by replacing a part (e. g., from about 1% to about 15 or 20% or more, still more particularly from 2% to 5 or 10%) of the initial acrylonitrile with an O-allylisourea, e. g., O-allylisourea itself and the N,N - (hydrocarbon - substituted) - O - allylisoureas, thereby to obtain a copolymeric acrylonitrile substance of improved dyeability is therefore quite apparent.

*Example 12*

To a reaction vessel are charged 10 parts of acrylonitrile, 10 parts of N,N-dimethyl-O-allylisourea and 0.2 part of α,α-azodiisobutyronitrile. The vessel is flushed with nitrogen gas and then heated to a temperature of 60–70° C. After a short induction period the monomeric mixture begins to polymerize. At the end of 2 hours the copolymer is removed, slurried with acetone to remove any remaining monomer and is then air-dried. The dry copolymer of acrylonitrile and N,N-dimethyl-O-allylisourea is a hard, yellow material.

Five parts of this copolymer is dissolved in 95 parts of a 50% aqueous solution of sodium thiocyanate. Four parts of the resulting solution of copolymer is then blended with 18 parts of a 50% aqueous solution of sodium thiocyanate having dissolved therein 1.71 parts of a copolymer obtained by polymerization of a mixture of 95% acrylonitrile and 5% methyl acrylate. A film that is cast from the resulting blend of the aforementioned copolymer solutions is receptive to acid dyes, using the dye test described in Example 11.

*Example 13*

To a reaction vessel equipped as in Example 2 are charged 5 parts N,N-dimethyl-O-allylisourea, 45 parts ethyl acrylate, 200 parts water, 2 parts of an emulsifying agent, specifically sodium lauryl sulfate, and 0.5 part of an organic peroxide polymerization catalyst, specifically benzoyl peroxide. The emulsion is stirred and maintained at 60° C. for 6 hours. At the end of the polymerization period the resulting copolymer of ethyl acrylate and N,N-dimethyl-O-allylisourea is precipitated by adding a small amount of aluminum sulfate to the emulsion. The precipitated copolymer is then filtered off and dried. This copolymer can be used as a modifier of homopolymeric acrylonitrile to improve the dyeability of the latter, especially with respect to acid dyes.

*Example 14*

Exactly the same procedure is followed as described under Example 13 with the exception that 45 parts of styrene is used instead of 45 parts of ethyl acrylate, and the time of polymerization is 8 hours instead of 6 hours. The resulting copolymer of styrene and N,N-dimethyl-O-allylisourea is isolated and dried as in Example 13. This copolymer, alone or admixed with dyes, fillers, stabilizers, or other additives, is suitable for use in the production of molding compositions and molded articles of various kinds.

*Example 15*

To a reaction vessel equipped as in Example 2 are charged 5 parts N,N-diethyl-O-allylisourea, 5 parts vinyl acetate, 190 parts water and 0.4 part of ammonium persulfate. The resulting solution is maintained at 100° C. for 8 hours. At the end of the reaction period the precipitated copolymer of vinyl acetate and N,N-diethyl-O-allylisourea is filtered off and dried. This copolymer may be used as a component of coating and impregnating compositions or as a modifier of other synthetic resins.

*Example 16*

To a reaction vessel equipped as in Example 2 are charged 2.5 parts O-allylisourea (N,N-unsubstituted-O-allylisourea), 7.5 parts methyl methacrylate, 40 parts water, 0.5 part sodium lauryl sulfate and 0.2 part of potassium persulfate. The emulsion is stirred and maintained at 100° C. for 6 hours. At the end of the reaction period the emulsion is broken by the addition of a small amount of aluminum sulfate, e. g., an aqueous solution containing 0.2 part of aluminum sulfate, after which the precipitated copolymer of methyl methacrylate and O-allylisourea is filtered off and dried. This copolymer, with or without dyes, fillers or other additives, is suitable for use as a molding composition, or as a component of such compositions, from which molded articles of various shapes are produced by molding under heat and pressure.

*Example 17*

Nine parts of vinyl acetate, 1 part of N,N-dimethyl-O-allylisourea and 0.2 part of benzoyl peroxide are mixed together and the resulting mixture is heated in a closed container at 60° C. for 24 hours to yield a resinous copolymer of the aforementioned comonomers. During the copolymerization an exothermic reaction takes place.

*Example 18*

A spinning solution is produced by dissolving 475 parts of N,N-dimethyl-O-allylisourea-acrylonitrile copolymer (obtained by polymerizing a mixture of 95% acrylonitrile and 5% N,N-dimethyl-O-allylisourea as described under Example 2) in a concentrated aqueous solution of sodium thiocyanate (about 50% NaSCN in water). The copolymer has an average molecular weight of about 70,000 as calculated from viscosity measurements using the Staudinger equation. The resulting solution is filtered, placed under vacuum and allowed to deaerate for about 66 hours. The solution contains about 9.88% of copolymer. Its viscosity, as measured by the time required for a Monel ball (one-eighth inch in diameter and weighing 0.1418 gram) to fall through 20 cm. of solution at 61° C., is 25.3 seconds.

The solution is spun into a fiber by extruding it through a spinneret, having 40 holes 90 μ in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched 850% by passing it through a bath of hot water maintained at a temperature of about 99.5° C., and then is taken up on bobbins where it is kept in a gelled state by applying a fine spray of water while the fiber is being collected on a bobbin. Additional information on the spinning conditions are given below:

Extrusion rate _____ 3.6 cc. per minute
Temperature of the solution at the spinning head _____ 70° C.
Pullaway speed _____ 4.35 meters per minute
Bobbin speed _____ 45.5 meters per minute
Calculated denier of the fiber _____ 89

Individual swatches of the gelled fiber are dried at room temperature and then are dyed in the same manner as described under Example 11. The fibers are dyed to a deep shade of blue. In marked contrast, a fiber similarly prepared from homopolymeric acrylonitrile remains colorless when placed in the same dye bath for the same length of time.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as components of molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, Patents 2,558,730, -731 and -733 with particular reference to the production of a molecularly oriented fiber from homopolymeric or copolymeric acrylonitrile. The unoriented and oriented fibers produced from my new copolymers are readily dyed, especially with an acid dye, while the fiber is in either a gel (e. g., hydrogel or aquagel) or a dry state.

The new materials (polymerizable compositions and polymerization products) of this invention have numerous other uses, for example uses such as are given in the aforementioned Drechsel and Padbury Patent No. 2,550,652.

The monomeric O-allylisoureas used in producing the new copolymers disclosed and claimed herein also may be polymerized alone to form homopolymers which are useful in industry, e. g., as a modifier of polymeric or copolymeric acrylonitrile (wherein no basic monomer is chemically combined in the copolymer) to improve the dyeability of the acrylonitrile polymerization product, especially toward acid dyes. Copolymers also can be produced from a mixture of copolymerizable monomers consisting of substantially more than 75% by weight thereof of an O-allylisourea and the remainder a different compound containing a $CH_2=C<$ grouping. In general, however, such proportions yield copolymers having no particular advantages, for the usual applications, over the products obtained by polymerizing a mixture of comonomers that contains 75% or less, by weight, of an O-allylisourea; and have the disadvantage, in general, of yielding a monomeric mixture which is less responsive to the usual polymerization conditions, e. g., time, temperature and catalyst required.

I claim:

1. A polymerizable composition comprising, by weight, (1) from about 1% to about 75% of an O-allylisourea represented by the general formula

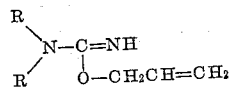

where R is a member of the group consisting of hydrogen, alkyl radicals and aryl radicals and (2) from about 25% to about 99% of a compound which is different from the compound of (1), is copolymerizable therewith and which contains a $CH_2=C<$ grouping.

2. A product comprising the polymerized composition of claim 1.

3. A composition comprising a copolymer of copolymerizable ingredients including, by weight, (1) from 1% to 20% of an O-allylisourea represented by the general formula

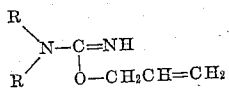

where R is a member of the group consisting of hydrogen, alkyl radicals and aryl radicals and (2) from 80% to 99% of a vinyl compound.

4. A composition as in claim 3 wherein the O-allylisourea is an N,N-dialkyl-O-allylisourea.

5. A composition as in claim 4 wherein the N,N-dialkyl-O-allylisourea is N,N-dimethyl-O-allylisourea.

6. A composition as in claim 4 wherein the N,N-dialkyl-O-allylisourea is N,N-diethyl-O-allylisourea.

7. A composition as in claim 3 wherein the O-allylisourea is an N,N-diaryl-O-allylisourea.

8. A composition as in claim 3 wherein the vinyl compound of (2) is a vinyl aromatic compound.

9. A composition as in claim 8 wherein the vinyl aromatic compound is a vinyl aromatic hydrocarbon.

10. A composition as in claim 9 wherein the vinyl aromatic hydrocarbon is styrene.

11. A composition as in claim 3 wherein the vinyl compound is a vinyl aliphatic compound.

12. A composition as in claim 11 wherein the vinyl aliphatic compound is acrylonitrile.

13. A composition as in claim 11 wherein the vinyl aliphatic compound is an alkyl ester of an arcrylic acid.

14. A composition as in claim 13 wherein the alkyl ester in an alkyl acrylate containing not more than 4 carbon atoms in the alkyl grouping.

15. A copolymer of mixed monomers consisting of from about 2% to about 15% by weight of N,N-dialkyl-O-allylisourea and the remainder acrylonitrile.

16. The method of preparing a new synthetic composition which comprises polymerizing, with the aid of a polymerization catalyst, a polymerizable mixture containing, by weight, (1) from 1% to about 75% of an O-allylisourea represented by the general formula

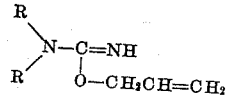

where R is a member of the group consisting of hydrogen, alkyl radicals and aryl radicals and (2) from about 25% to about 99% of a compound which is different from the compound of (1), is copolymerizable therewith and which contains a $CH_2=C<$ grouping.

JOHN A. PRICE.

References Cited in the file of this patent

UNITED STATES PATENTS

| Number | Name | Date |
|---|---|---|
| 2,544,638 | Caldwell | Mar. 13, 1951 |

OTHER REFERENCES

Canadian Journal of Research, vol. 17, sec. B, 1939, page 393.